March 24, 1936.　　　S. KARRER　　　2,035,073
SHAFT SEALING MEANS
Filed March 19, 1934　　2 Sheets-Sheet 1
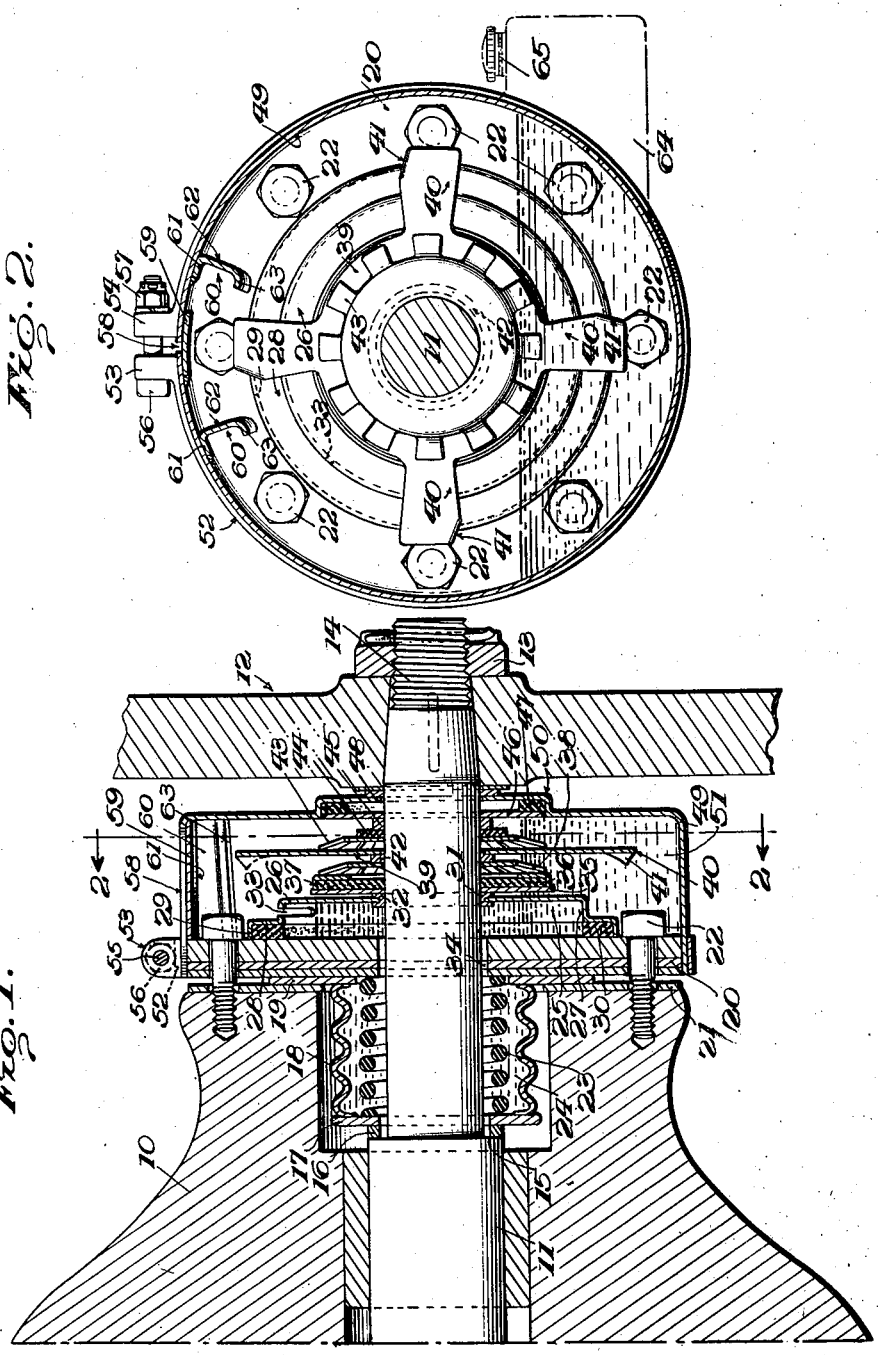

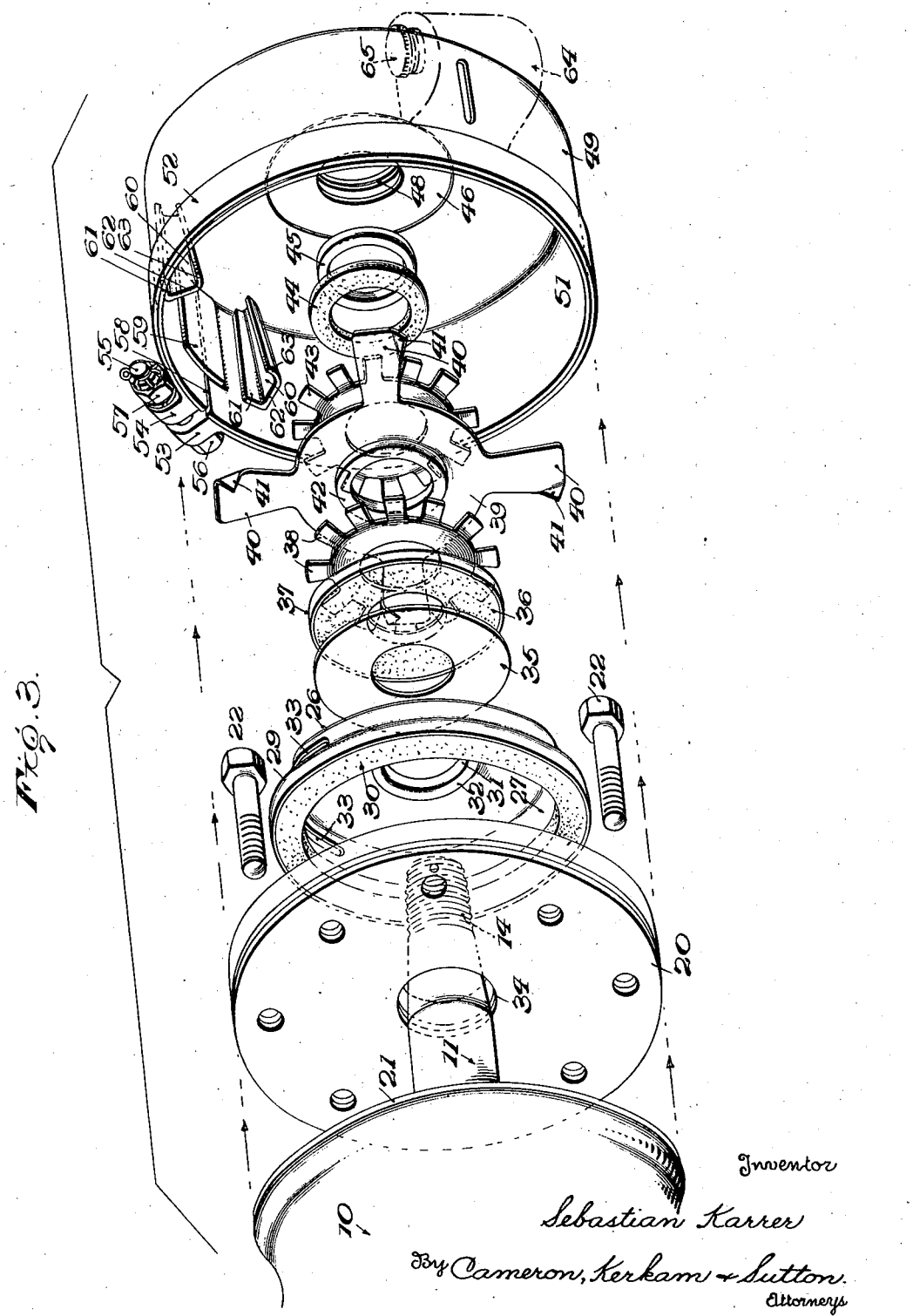

Patented Mar. 24, 1936

2,035,073

UNITED STATES PATENT OFFICE 2,035,073

SHAFT SEALING MEANS

Sebastian Karrer, Washington, D. C., assignor to Consolidated Gas Electric Light and Power Company of Baltimore, Baltimore, Md., a corporation of Maryland Application March 19, 1934, Serial No. 716,376

18 Claims. (Cl. 286—11)

This invention relates to shaft sealing devices, and more particularly to devices of this character for sealing the shafts of pumps or compressors used in refrigerating systems and units.

It is known practice to provide the shaft of such a compressor or pump, where it passes through the casing wall thereof to receive an exterior flywheel or other means for driving the same, with a sealing device in the form of relatively rotatable surfaces which are resiliently urged into contact and one of which is commonly carried by a flexible wall sealed to the casing and forming a chamber around the shaft. Due to the difference of pressure existing interiorly and exteriorly of the compressor casing, considerable difficulty has been experienced in preventing the ingress of air past these relatively rotating though contacting surfaces as well as the escape of the gas or vapor constituting the refrigerant. As air thus entering the compressor is likely to contain some water vapor, ingress of air, over and above the dilution of the refrigerant, causes much trouble by reason of corrosion, particularly when the refrigerant is sulphur dioxide. This leakage of air and gas past these relatively rotatable surfaces may be substantially eliminated if a liquid film is maintained between them, and the present invention has for its primary object the provision of novel means for maintaining a liquid film between said relatively rotatable sealing surfaces.

The form of compressor seal heretofore commonly used employs an expansible and collapsible corrugated tubular wall provided with an end wall which carries one of the relatively rotatable sealing surfaces. This tubular wall forms an annular chamber surrounding the shaft which may be filled with a liquid sealing medium, preferably also acting as a lubricant, but experience has demonstrated that merely filling such a chamber with a liquid sealing medium does not satisfactorily solve the difficulty heretofore referred to, because the liquid level in said chamber becomes lowered by lapse of time, leaving the upper part of the relatively rotatable sealing surfaces unsubmerged by the body of the sealing liquid. Hence leakage of air and gas may occur between the upper portions of said surfaces. The present invention has for an object the provision of novel means whereby the relatively rotatable sealing surfaces are at all times during operation of the compressor maintained submerged by the sealing liquid.

Another object of this invention is to provide a device of the type characterized which minimizes escape of liquid along the shaft and which at the same time avoids the need for complex or expensive sealing devices to prevent substantial leakage of the sealing liquid along the shaft.

Another object of this invention is to provide a device of the type characterized which may be readily installed as a unit on compressors or pumps whether the installation occurs as a part of the original equipment or as an accessory applied to pumps or compressors already in service.

Another object of this invention is to provide a device of the type characterized which is relatively simple in construction and which may be manufactured by simple operations not requiring highly skilled labor so that the device is relatively inexpensive to produce.

Another object of this invention is to provide a device of the type characterized whereby a chamber surrounding the shaft and contiguous to the relatively rotatable sealing surfaces may be quickly filled with a sealing liquid and said sealing surfaces be maintained submerged by said liquid although the main body of said liquid outside of said chamber is below the level of the shaft so as to minimize the tendency of said liquid to escape from its containing means along the surface of the shaft.

Other objects will appear as the description of the invention proceeds.

The invention is capable of receiving a variety of mechanical expressions, one of which is shown on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures, Fig. 1 is an enlarged axial section of a device embodying the present invention;

Fig. 2 is a transverse section on the line 2—2 of Fig. 1; and

Fig. 3 is a perspective view of the elements embodied in the construction of Figs. 1 and 2 but drawn apart to more clearly illustrate their construction and relationship.

Referring in detail to the drawings, 10 designates a portion of the casing or housing of a compressor or pump which may be of any suitable character and construction. Projecting from the interior of the housing 10 is the driving shaft 11 which extends exteriorly of said casing and is there provided with a flywheel, driving pulley, gear, or other suitable member 12 for driving said shaft. Member 12 is retained on said shaft in any suitable way, as by a nut 13 cooperating with the threaded extremity 14 of said shaft.

Shaft 11 in the form shown is reduced in diameter so as to provide a shoulder 15, and cooperating with said shoulder 15 is a bearing ring 16 of any suitable material carried by the movable end wall 17 of an expansible and collapsible corrugated tubular wall 18. Said wall may be integral with or suitably attached, as by soldering or brazing, to said end wall 17, and at its opposite end said tubular wall 18 has integrally formed thereon or suitably attached thereto, as by soldering or brazing, an end flange 19. Tubular wall 18 with its bearing ring 16 is suitably retained in position by means of said flange 19, as by means of a clamping plate or plates 20 gripping flange 19 between the same and the exterior surface of the casing 10 or a plate 21 suitably attached thereto, the attaching means here shown being a plurality of machine screws 22. Interposed between said plate or plates 20 and the end wall 17 is a coil spring 23 which normally urges the bearing member 16 into bearing engagement with the shoulder 15. The construction so far described is well known in the art and has been selected as typical of any suitable construction providing relatively rotatable bearing surfaces with which is associated a chamber contiguous to said bearing surfaces and surrounding the shaft adjacent thereto, but it is to be expressly understood that any other known or suitable construction providing relatively rotatable bearing surfaces and a contiguous chamber may be employed in the present invention.

In the construction so far described the relatively rotatable bearing surfaces 15 and 16 are maintained in rubbing contact by the coil spring 23, the expansible and collapsible wall 18 permitting such movement of the member 16 with respect to the shoulder 15, both axially and angularly, as may be required by the wearing of the surfaces, any wabbling of the shaft, etc. Experience has demonstrated that notwithstanding the fact that said bearing surfaces 15 and 16 are urged into contact with considerable pressure by the spring 23 some leakage of air takes place between said bearing surfaces 15 and 16 under the difference of pressure existing interiorly and exteriorly of the casing.

If a liquid film is maintained between said rubbing surfaces, however, this leakage may be substantially eliminated. Any suitable sealing liquid may be employed, but as it is desirably also a lubricant, a lubricating oil is preferred. If the chamber 24 within said tubular wall 18 be merely filled with a sealing liquid and the chamber closed, after a lapse of time the level of the liquid will become lowered in the chamber 24, particularly by leakage of the liquid along the shaft, until the upper portions of said sealing surfaces are no longer submerged.

The present invention provides means whereby the chamber 24 may be maintained full of sealing liquid and whereby at the same time the main body of said liquid is maintained at a level below that of the bottom of the shaft so that leakage along the shaft is substantially eliminated without the need of complex and expensive sealing means at the shaft openings.

In conformity with the present invention a reservoir for the sealing liquid is mounted on the compressor casing around the shaft and contains within the same a body of sealing liquid whose level is below the lowermost surface of the shaft. Also within said reservoir is a receiving chamber which surrounds the opening to said chamber 24, and a rotary means in said reservoir is adapted to pick up liquid from said body of liquid and deliver it to said chamber. Thereby under normal operating conditions said receiving chamber and the chamber 24 are maintained full of sealing liquid by liquid transported thereto, but if after a long lapse of time the liquid has seeped from chamber 24 so as to lower the level therein, said chamber 24 and its receiving chamber will be promptly filled with said sealing liquid and the sealing relationship established when the compressor is started into action. Thereby a suitable head on the sealing liquid at the sealing surfaces is automatically maintained during the operation of the compressor or pump and automatically established as soon as the compressor starts in operation. Experience has demonstrated that the chamber 24 and the receiving chamber referred to will be filled by the device of the present invention before the compressor can lower the pressure therein sufficiently below atmospheric to cause an ingress of air between the relatively rotatable sealing surfaces.

At the same time the body of liquid from which the sealing liquid is derived has its level always below the level of the opening through which the shaft passes, while any seepage of liquid from the receiving chamber is back into said body of liquid. Hence there is little tendency for the liquid to escape along the shaft and such tendency as exists is nullified by liquid-tight packing around the shaft. Therefore the charge of liquid is maintained indefinitely and frequent need for inspection is avoided.

Receiving chamber 25 may be of any suitable size and construction. It is preferably shallow in an axial direction and desirably so formed that it may be readily stamped out of sheet metal. As illustrated said chamber is provided by a receptacle formed from a dished plate and having an end wall 26, an intermediate axially extending portion 27, a radially extending portion 28 surrounding said portion 27, and a second axially extending portion 29 forming the outer periphery of said receptacle. Portions 28 and 29 form a peripheral annular chamber adapted to receive and retain a packing member 30 of any suitable material as cork or leather whereby a relatively fluid-tight joint may be formed with the casing 10 or as shown the face of the member 20. The diameter of the axially extending peripheral portion or flange 29 is preferably such that said receptacle is received within the circle defined by the attaching screws 22, and the diameter of the chamber within the axially extending portion 27 is preferably at least somewhat larger than the diameter of the corrugated tubular wall 18. The end wall 26 has a central aperture 31 to receive the shaft 11, and a ring 32 of relatively soft metal, such as bronze, is preferably mounted in said aperture 31, and retained therein in any suitable way, as by spinning, crimping, etc. As said receptacle is not rotatable ring 32 provides a bearing surface for a rotatable member hereinafter described.

To provide for the admission of sealing liquid to said chamber 25 the axially extending portion 27 thereof is provided at its uppermost portion with an inlet 33 in the form of a slot or a plurality of apertures so that the liquid may be directed thereinto in a manner hereinafter described. The receptacle forming said receiving chamber 25 may therefore be readily stamped from sheet metal, as brass or bronze, the slot or apertures 33 formed in its peripheral portion 27, the ring 32 suitably secured in the central aperture of its end wall, and the packing ring 30 secured in the recess defined by the portions 28 and 29. Said receptacle is then ready to be secured in position against the outer face of the member 20 in surrounding relation with the aperture 34 through which the shaft passes to the exterior of the casing 10. Said receptacle may then be secured in position against rotation in any suitable way. Preferably it is merely pressed firmly against the member 20, to form a liquid-tight joint therewith, by the resilient means hereinafter described, and rotation thereof is prevented as by soldering or otherwise suitably securing to the periphery thereof one or more projections which will engage the head or heads of the machine screws 22 and thereby hold said receptacle stationary with its slot or apertures 33 at the top thereof. While the foregoing constitutes an inexpensive construction for the receiving chamber, it is to be expressly understood that it may be fabricated in any other suitable way or take any other suitable form within the limits of the functions to be performed thereby as hereinafter explained.

Cooperating with the outer surface of the ring 32 is a washer 35, preferably of hard metal, as steel. Exteriorly of said washer 35 is a flexible washer 36 of any suitable material, such as leather, and exteriorly of the washer 36 is a metallic washer 37 which may take the form of a dished member having its peripheral flange of such a diameter as to receive the washer 36 therein as illustrated. The washer 36 has its interior aperture of such size as to tightly grip the shaft 11 and washer 35 also preferably closely surrounds the shaft, but as washer 37 performs its primary function by engagement with the outer peripheral portion of the washer 36 its central aperture, if preferred, may be made substantially larger than the shaft diameter. Washers 35, 36, 37 constitute a unit which is mounted to rotate with the shaft, and to prevent relative rotation between these three washers the metal washers may have inwardly extending projections or indentations adapted to bite into the material of the flexible washer 36.

The unit composed of washers 35, 36, 37 is pressed into bearing engagement with the ring 32 by means of a resilient disk 38, shown as in the form of a dished disk of spring metal, as steel, having a dentated periphery and of approximately the same diameter as the washer 37 so that the spring disk 38 when under axial pressure urges the unit composed of washers 35, 36, 37 into bearing engagement with the ring 32 and at the same time the receptacle forming the chamber 25 is pressed at its washer 30 into tight contact with member 20. The construction of units 35, 36, 37 permits some distortion of the flexible washer 36 to maintain a sealing contact between the ring 32 and washer 35 at the inner periphery of the latter without interfering with the maintenance of an oil-tight joint between said washer 36 and the periphery of the shaft.

Mounted on the shaft exteriorly of the spring disk 38 is a suitable means for transferring liquid to the inlet 33, here shown as a liquid-throwing member in the form of a disk 39 provided with one or more arms 40 each of which has an inwardly bent portion 41 at what may be called the trailing, as distinguished from the leading, corner of the arm for the particular direction of rotation of the shaft 11. At its inner periphery disk 39 has formed thereon or suitably attached thereto a ring 42 which engages the inner periphery of the resilient disk 38 and transmits pressure thereto. Ring 42 is designed to fit the shaft 11 tightly so that the member 39 rotates with the shaft.

Exteriorly of said member 39 is a second resilient disk 43 which may be of the same construction as disk 38 and which engages said member at or near its outer periphery. Exteriorly of the resilient disk 43 is a flexible washer 44 tightly gripping the shaft and engaging said resilient disk 43 at its inner periphery. Exteriorly of said washer 44 is a ring 45 of any suitable soft metal, such as bronze, surrounding the shaft and forming a fluid-tight contact with said washer 44. Exteriorly of the ring 45 is a ring 46, preferably of hard metal, such as steel, having a bearing engagement with said ring 45. Exteriorly of the disk 46 is a washer 47 of suitable packing material, such as rubberized fabric, cork, leather, etc., adapted to make a fluid-tight contact with the outer periphery of said disk 46 and itself making a fluid-tight contact with the end wall 48 of the reservoir 49 next to be described. Disk 46 is designed to be stationary, and therefore it provides a bearing surface for the ring 45 which, together with the washer 44, resilient disk 43, member 39, resilient disk 38 and washer unit 35, 36, 37, rotates with the shaft.

Reservoir 49 takes the form of a cup-like generally cylindrical member which may be conveniently formed by stamping the same from sheet metal and which as shown has a depression 50 formed at the central portion of its end wall in which is received the washer 47, so that when the parts are assembled the disk 46 lies substantially in the plane of the end wall of the reservoir.

The diameter of the reservoir 49 is preferably such that it may be snugly slipped over the periphery of a cylindrical portion of or on the casing 10, here shown as the disk or disks 20, and form therewith a completely enclosed chamber 51. Any suitable means may be provided for tightly and fixedly securing said reservoir to the periphery of the disk or disks 20, with or without the interposition of a gasket as desired. As shown, a split resilient ring 52 has suitably attached to its ends a pair of blocks 53 and 54. Passing through said blocks is a bolt 55 having a suitable head 56, which may be made noncircular or provided with a kerf so that it may be held against rotation, and receiving a nut 57 threaded onto its opposite end. When the reservoir has been slipped over the periphery of the disk or disks 20 the nut 57 may be tightened until said ring 52 tightly grips the periphery of said reservoir to the periphery of said disk or disks 20, and if desired a cementitious material may be interposed between the periphery of said disk or disks and the peripheral wall of said reservoir so as to form a fluid-tight joint therebetween. To give the peripheral wall of the reservoir some capacity for yielding it is preferably slotted as shown at 58, in which event an internal baffle 59 may be suitably secured to the wall of said reservoir, as by soldering, so as to prevent the liquid within the reservoir from being thrown through said slot 58 by the members 39, 40, 41.

Also secured to the inner face of the peripheral wall of the reservoir 49 are one or more baffle members 60 having such length that when the reservoir 49 is secured in position their inner ends overlie the inlet 33 to chamber 25. As shown said baffles have flanges 61 by which they may be secured, as by soldering, to the wall of the reservoir 49, inwardly extending body portions 62, and circumferentially directed flanges 63 which are also inclined downwardly and inwardly. Hence liquid thrown outwardly by the bent portions 41 of the vanes 40 will be caught by said baffles 60 and the liquid will flow along the flanges 63 and drop through the slot or apertures 33 into the receiving chamber 25.

When the parts are assembled in the order in which they have been described, by passing the same over the exteriorly projecting end of the shaft 11 after driving member 12 has been removed, said driving member may be mounted on the shaft and the reservoir and its contained parts are thereby disposed between said member and the casing 10. The axial dimension of the reservoir 49 is such that when the parts are assembled as described, the resilient disks 38 and 43 are placed under a tension. Disk 43 therefore maintains the bearing members 45 and 46 in bearing contact and at the same time maintains a sealing contact between the washer 47 and the disk 46 and end wall 48 of the reservoir, while the washer 44, tightly fitting the periphery of the shaft, prevents seepage of the liquid along the shaft. Disk 38 maintains a sealing contact between the ring 32 and the disk 35, and between the packing 30 and the member 20, while washer 36 prevents seepage of the liquid from the receiving chamber 25 along the shaft.

The interior of the chamber 51 provided by reservoir 49 is supplied with a sealing liquid, preferably oil, to a level which is below the periphery of the shaft, and therefore below the shaft opening in said reservoir. The volume of liquid should be such that there is still a substantial reserve in the reservoir when the receiving chamber 25 and the chamber 24 have been completely filled, and the capacity of the reservoir should be such that when said chambers are empty the liquid level does not rise to the periphery of the shaft. In order to afford the requisite storage space the reservoir 49 may be provided at one or both of its sides with an extension 64 which also affords a convenient means for the provision of a filling opening shown as closed by a filler cap 65. If such an extension is not provided the filling opening may be suitably formed in the periphery of the reservoir 49.

A suitable charge of the sealing liquid being placed in the reservoir 49, as soon as the shaft 11 starts to rotate said liquid is picked up by the inwardly bent portions 41 of the vanes 40 and thrown outwardly against the peripheral wall of the reservoir 49, that portion that is collected by the baffles 60 being directed into the inlet 33 of the receiving chamber 25. Therefore, in a very brief period of time after the shaft starts in rotation, and before the pressure in the compressor has dropped materially below atmospheric, the chamber 24 and receiving chamber 25 are filled with said liquid. As soon as said chambers 24 and 25 are filled with the sealing liquid the sealing film established between the rubbing surfaces 15 and 16 is maintained under the head determined by the height of the sealing liquid in the chamber 25. As long as the compressor is in action the chambers 24 and 25 are maintained full of the sealing liquid, and therefore the head of liquid on the sealing surfaces is automatically maintained. When the compressor stops the body of liquid in the chambers 24 and 25 is retained therein because of the seal established between the outer periphery of the chamber 25 and the end face of member 20 and between the inner periphery of said chamber and the member 35. Hence during the normal pauses between operations of the compressor the sealing liquid is retained in said chamber to prevent ingress of air. If, however, the compressor should be shut off for a long period of time so that eventually the slight leakage that is unavoidable lowers the level of the liquid in said chambers 24 and 25, said chambers are automatically refilled almost immediately upon initiation of the rotation of the shaft 11.

Thereby the present invention affords means whereby the sealing film between the surfaces 15 and 16 is automatically established and maintained while at the same time the body of the liquid in the reservoir 49 has its surface always below the level of the shaft openings in the reservoir so that there is little or no tendency for escape of said liquid along the shaft. The washers making fluid-tight contact with the shaft substantially eliminate flow of the liquid along the shaft when the shaft is rotating and any leakage from the chamber 25 is back into said body of liquid in the reservoir. As a fluid-tight contact is initially established between the periphery of the reservoir and the periphery of the members 20 the initial charge of liquid will last for a relatively long time, thereby avoiding any difficulty due to premature escape of said liquid along the shaft, in the absence of frequent inspection, that may result in the sealing surfaces being so far exposed as to permit the passage of air and gas therebetween in the manner heretofore described.

The elements of which the structure of the present invention is composed as heretofore described are such that they may be readily formed by simple stamping and crimping operations, and therefore the structure may be inexpensively fabricated without the use of complicated equipment or highly skilled labor. The structure is easily installed, either as initial equipment or on equipment already in service, and provides a means for efficiently maintaining a seal between the relatively rotatable surfaces on the compressor shaft for a relatively long period of time without need for inspection.

While the embodiment of the invention illustrated on the drawings has been described with considerable particularity and detail, it is to be expressly understood that the invention is not restricted thereto. Other forms of chamber 25 may be used as heretofore pointed out, and the various washers, resilient disks, etc., may be made of other forms or substituted by other elements performing equivalent functions, and changes may also be made in the details of construction, arrangement, proportion and size of the parts, and certain features used without other features, without departing from the spirit of this invention. Reference is therefore to be had to the appended claims for a definition of said invention.

What is claimed is:

1. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, means in said reservoir forming a receiving chamber in communication with said first named chamber and normally maintaining a head on the sealing liquid in said first named chamber, and means for transferring liquid from a body of liquid in said reservoir to said receiving chamber.

2. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, means in said reservoir forming a receiving chamber in communication with said first named chamber, and means on said shaft adapted to transfer liquid from a body of liquid in said reservoir below the level of said shaft to an inlet in said receiving chamber above the level of the top of said first named chamber.

3. In a sealing device for a compressor pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, said reservoir adapted to contain a body of sealing liquid below the level of the shaft, a receiving chamber in said reservoir in communication with the first named chamber and having an inlet adjacent the top thereof, said receiving chamber when filled adapted to maintain said first named chamber full of sealing liquid under a head existing in said receiving chamber, and means rotatable with said shaft for transferring liquid from a body of liquid in said reservoir to said receiving chamber.

4. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, said reservoir adapted to contain a body of sealing liquid below the level of the shaft, a receiving chamber in said reservoir in communication with the first named chamber and having an inlet above the level of said first named chamber, said receiving chamber when filled adapted to maintain said first named chamber full of sealing liquid, said receiving chamber closing the aperture in said casing through which said shaft extends and forming a fluid-tight contact with said casing to retain said liquid in said first named chamber, and means rotatable with said shaft for transferring liquid from a body of liquid in said reservoir to said receiving chamber.

5. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, means in said reservoir forming an oil receiving chamber in communication with said first named chamber, means for transferring liquid from a body of liquid in said reservoir to said receiving chamber, and means to prevent flow of oil along said shaft to the shaft opening in said reservoir.

6. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, means in said reservoir forming an oil receiving chamber in communication with said first named chamber, means for transferring liquid from a body of liquid in said reservoir to said receiving chamber, and means at the shaft opening of said receiving chamber for retaining the liquid in said chamber and for preventing such liquid as may escape from said chamber from flowing along said shaft.

7. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, means in said reservoir forming an oil receiving chamber in communication with said first named chamber, said receiving chamber having an inlet above the level of said receiving chamber rotating means on said shaft for throwing liquid against the wall of said reservoir, and means for leading the thrown liquid to the inlet of said receiving chamber.

8. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, said reservoir having a yielding peripheral wall, a resilient clamping ring for clamping said peripheral wall tightly to a cylindrical element of said casing, means in said reservoir forming an oil receiving chamber in communication with said first named chamber, and means for transferring liquid from a body of liquid in said reservoir to said receiving chamber.

9. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, an axially shallow annular member in said reservoir adapted to form an axially shallow receiving chamber in communication with said first named chamber, means for pressing said annular member into fluid-tight contact with the wall of said casing, and means for transferring liquid from a body of liquid in said reservoir below the level of said shaft to the inlet of said receiving chamber.

10. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, a shallow annular member in said reservoir adapted to form a receiving chamber around said shaft in communication with said first named chamber, means cooperating with the shaft opening in said annular member to retain liquid therein and prevent flow of liquid along said shaft, means for pressing said last named means against said annular member and said annular member against the wall of said casing, and means for transferring liquid from a body of liquid in said reservoir below the level of said shaft to the inlet of said receiving chamber.

11. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, a shallow annular member in said reservoir adapted to form a receiving chamber around said shaft in communication with said first named chamber, a rotary disk making a sealing contact with said annular member at the shaft opening therein, means for pressing said disk against said annular member, and means on said shaft for transferring liquid from a body of liquid in said reservoir below the level of the shaft to the inlet to said receiving chamber.

12. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, a shallow annular member in said reservoir adapted to form a receiving chamber around said shaft in communication with said first named chamber, a rotary disk making a sealing contact with said annular member at the shaft opening therein, a flexible washer tightly gripping said shaft and rotatable with said disk to prevent flow of liquid along said shaft, means for pressing said disk against said annular member, and means on said shaft for transferring liquid from a body of liquid in said reservoir below the level of the shaft to the inlet to said receiving chamber.

13. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, means in said reservoir forming an oil receiving chamber in communication with said first named chamber, means for transferring liquid from a body of liquid in said reservoir below the level of the shaft to the inlet to said receiving chamber, means for sealing the shaft opening in said reservoir, and means for resiliently pressing said sealing means into sealing contact.

14. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, means in said reservoir forming an oil receiving chamber in communication with said first named chamber, means for transferring liquid from a body of liquid in said reservoir below the level of the shaft to the inlet to said receiving chamber, stationary packing means cooperating with the end wall of said reservoir to seal the shaft opening therein, and means on the shaft for preventing flow of liquid along the shaft to said opening.

15. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, means in said reservoir forming an oil receiving chamber in communication with said first named chamber, means for transferring liquid from a body of liquid in said reservoir below the level of the shaft to the inlet to said receiving chamber, stationary packing means cooperating with the end wall of said reservoir to seal the shaft opening therein, means rotating with the shaft and forming a bearing contact with said sealing means, and means for resiliently pressing said last named means into contact with said packing means.

16. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, a stationary annular member in said reservoir surrounding the shaft and forming with the end wall of the casing a receiving chamber in communication with said first named chamber, a rotary member on said shaft for transferring liquid from a body of liquid in said reservoir below the level of the shaft to the inlet to said receiving chamber, stationary packing means surrounding the shaft for sealing the shaft opening in said reservoir, and resilient disks between said rotary member and said annular member and between said rotary member and said packing means for forming fluid-tight contacts at said packing means and between said annular member and the casing wall.

17. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, a stationary annular member in said reservoir surrounding the shaft and forming with the end wall of the casing a receiving chamber in communication with said first named chamber, a rotary member on said shaft for transferring liquid from a body of liquid in said reservoir below the level of the shaft to the inlet to said receiving chamber, stationary packing means surrounding the shaft for sealing the shaft opening in said reservoir, resilient disks between said rotary member and said annular member and between said rotary member and said packing means for forming fluid-tight contacts at said packing means and between said annular member and the casing wall, and washers tightly gripping the shaft adjacent each resilient disk for preventing flow of liquid along the shaft.

18. In a sealing device for a compressor or pump, in combination with a shaft and means forming a chamber around said shaft with relatively rotatable engaging sealing surfaces therebetween, means for maintaining said chamber filled with a sealing liquid to maintain a sealing film between said relatively rotatable surfaces, said means including a reservoir adapted to surround said shaft and make a liquid-tight contact with the casing of said compressor or pump, a stationary annular member in said reservoir surrounding the shaft and forming with the end wall of the casing a receiving chamber in communication with said first named chamber, a rotary member on said shaft for transferring liquid from a body of liquid in said reservoir below the level of the shaft to the inlet to said receiving chamber, a stationary packing means surrounding the shaft for sealing the shaft opening in said reservoir, resilient disks between said rotary member and said annular member and between said rotary member and said packing means for forming fluid-tight contacts at said packing means and between said annular member and the casing wall, and rotary members on said shaft adjacent each resilient disk and pressed thereby into bearing engagement with said annular member and said packing means.

SEBASTIAN KARRER.